United States Patent [19]

Penczuk et al.

[11] 4,336,166
[45] Jun. 22, 1982

[54] COLD WATER RESISTANT ADHESIVE

[75] Inventors: Anatole G. Penczuk, Jackson; Julius Sirota, South Plainfield, both of N.J.

[73] Assignee: National Starch and Chemical Corporation, Bridgewater, N.J.

[21] Appl. No.: 234,144

[22] Filed: Feb. 13, 1981

[51] Int. Cl.³ .................. C08L 3/02; C08L 25/16
[52] U.S. Cl. ............................... 524/53; 524/562
[58] Field of Search ............. 260/17.4 ST, 29.6 TA, 260/17.4, 29.6

[56] References Cited

U.S. PATENT DOCUMENTS

| | | | |
|---|---|---|---|
| 2,570,561 | 10/1951 | Kinney | 106/146 |
| 3,058,836 | 10/1962 | Sirota | 106/146 |
| 3,280,050 | 10/1966 | Johnson | 260/17.4 ST |
| 3,692,713 | 9/1972 | Columbus et al. | 260/17.4 ST |
| 3,857,803 | 12/1974 | Shenfeld et al. | 260/17.4 ST |
| 3,939,108 | 2/1976 | Sirota et al. | 260/17.4 ST |
| 4,154,713 | 5/1979 | Zima et al. | 260/29.6 TA |

*Primary Examiner*—Theodore Morris
*Attorney, Agent, or Firm*—E. Szala; Ellen T. Dec

[57] ABSTRACT

Storage-stable, ice-proof, adhesives characterized by superior rheological and machining properties are prepared from an ammoniacal mixture of starch, a zinc salt of a carboxylated styrene-acrylate resin, peptizer and water.

9 Claims, No Drawings

COLD WATER RESISTANT ADHESIVE

BACKGROUND OF THE INVENTION

I. Field of the Invention

A novel storage stable, ice-proof adhesive for labeling bottles is provided which comprises an alkaline mixture of starch, a zinc salt of a carboxylated styrene-acrylate resin, peptizer and water.

II. Brief Description of the Prior Art

Ice-proof or cold water resistant labeling adhesives have been used for many years for conditions where extreme humidity resistance and label removal are required as, for example, in labeling beer and soda bottles, and pharmaceutical containers. Heretofore, most of these adhesives were based on casein in combination with metallic salts; however, the problems associated with caseins, e.g. cost, availability, variations in quality, etc., instigated searches for casein substitutes, especially those based on low cost, readily available starches.

Recently adhesives based on starch and ammonium salts of styrene-maleic anhydride resins have been proposed as represented by those described in U.S. Pat. Nos. 3,939,108 and 3,857,803. Similar adhesive systems have also been prepared based on carboxylated styrene-acrylate resins. Ordinarily, such adhesives have provided a satisfactory degree of water-resistance, and in some cases label removability. However, they have suffered drawbacks in their tendency to be unstable either on aging or in reproducibility and in their less than optimum machining or rheological properties. Thus, with respect to stability characteristics, in some instances it has been difficult to reproduce batches substantially uniform in viscosity, stability and machinability from a given formula, without making expensive and time-consuming adjustments upon each batch. Moreover, even when batches appeared satisfactory initially, after aging for 2 or 3 month periods, samples were found to change in viscosity or consistency, sometimes even pasting-up or gelling in the storage container. As regards rheology, it must be understood that the high speed labeling machines employed in industry require adhesives which are non-stringing, have a long working life and are fast-setting.

There is thus a need in the art for an ice-proof adhesive for labels which possesses good storage stability and rheology without sacrifice in the properties of cold water resistance and label removability.

SUMMARY OF THE INVENTION

It has now been found that improved ice-proof or cold water resistant adhesives which possess a balance of water resistance and label removability may be prepared from an ammoniacal mixture of starch, a zinc salt of a carboxylated styrene-arcylate resin, peptizer and water. These adhesives manifest a four-fold improvement over the conventionally available styrene-acrylate and styrene-maleicanhydride resins with respect to stability on aging, batch-to-batch reproducibility and machine rheology as well as an improvement in ice-proof properties.

While we do not wish to be bound by theory, it is postulated that this improvement occurs mainly via the ability of the zinc salt to prevent or minimize the interaction of the polymeric hydroxyl groups of the starch with the polymeric carboxyl group of the resin during processing and future aging; thereby stabilizing the product. This is contrary to that exhibited by non-zinc salts of the same resin.

In general, the adhesives of the present invention are prepared by blending a cold water slurry of the starch(es), preferably with an aqueous dispersion of bentonite, and a zinc salt of a carboxylated styrene-acrylate resin, the latter generally being supplied in the form of an ammoniacal latex or emulsion. After mild heating, a peptizer is mixed in, followed by additional heating and addition, if necessary, of further ammonia or other alkali to raise the pH to the desired level of 7.5 to 10. After cooling, the mixture is filtered if necessary, adjusted with water to the desired viscosity and stored until required. Defoamers, preservatives, plasticizers, coloring agents, silane primers and other conventionally employed modifying agents may be added to the adhesive without affecting the spirit or essence of the invention.

DESCRIPTION OF THE PREFERRED EMBODIMENTS

As a base for the adhesives of the present invention, either raw starches or converted or modified starches may be employed. Thus, starches derived from any plant source including corn, potato, sweet potato, wheat, rice, sago, tapioca, waxy maize, sorghum, high amylose corn, etc. may be employed as may the corresponding conversion products as those dextrins prepared by the hydrolytic action of acid and/or heat, the oxidized starches prepared by treatment with oxidants such as sodium hypochlorite, fluidity or thin boiling starches prepared by enzyme conversion or by mild acid hydrolysis or the corresponding ester or ether starch derivatives. The starches may be used singly or in combination to achieve various final properties in the adhesive composition. The preferred starches are amioca based since these starches, when cooked, have a higher resistance toward pasting-up on aging. Raw corn starch or other starch derivatives may additionally be blended into the mixture for the desired rheological or machining properties. The starch employed is used in an amount of about 10 to 35%, preferably 20 to 30% of the total formulation.

The term "zinc salt of a carboxylated styrene-acrylate resin" as used herein is meant to include zinc salts of resins (or polymers) comprising 10 to 90% styrene and 90 to 10% acrylate and further containing 1 to 10% of carboxylated monomers per 100 parts styrene-acrylate resin. The acrylate portion of the polymer can comprise, for example, methyl, ethyl, butyl, hexyl, or octyl acrylate or mixtures thereof, while the carboxylated monomers can comprise acrylic or methacrylic acid. The resin salts are partial or full zinc salts containing 1,000 to 15,000 parts per million zinc based on dry basis of total resin. These resin salts are generally available commercially as ammoniacal latices containing approximately 40% solids and having a pH of approximately 7.5 to 9.5. Alternatively, carboxylated styrene-acrylate resins may be converted to suitable salts by the judicious addition of zinc compounds, e.g. zinc ammonia carbonate solution. The resins suitable for use herein, either directly or after subsequent addition of zinc, are available, for example, under the tradenames "Crilicon" (Ionac Chemical-Birmingham, N.J.) "Neocryl" (Polyvinyl Chemical Industries-Wilmington, Mass.); "Acrysol" (Rohm & Haas); "Versacryl" (S. C. Johnson) and "Ucar" (Union Carbide). If desired, the zinc resin latices may be prepared directly from the respective monomeric components using procedures well known to those skilled in the art. If the resin salts are not obtained in the form of alkaline latices, it will be necessary to convert them into such form as, for example, by the addition of ammonia water.

These resin salts are generally used at a level of about 3 to 20% (solids or dry weight), preferably 5.5 to 7%, based on the total adhesive formulation.

The peptizer for the starches employed herein are those conventionally used such, for example, as urea, formamide, ammonium thiocyanate, acetamide, thiourea and dicyandiamide or mixtures thereof. The amount of peptizer employed will vary from 1.5 to 6%, preferably 4 to 5%, by weight of the total adhesive formulation depending upon a number of factors, particularly the type of starch based used. Thus, starches containing larger amounts of linear amylose as compared to the branched amylopectin units will require larger quantities of peptizer.

In order to achieve adhesives characterized by optimum properties, it may be necessary to add a viscosity modifying agent such as, for example, hydrophilic cellulose ethers, polyvinyl alcohol, linseed meal, pectins, pectates, bentonite and the like. In particular, the addition of up to about 2%, preferably 0.6 to 1%, based on the adhesive formulation, of bentonite has been found to enhance the physical properties of the formulations described herein, possibly due to a replacement reaction between the zinc ions and the sodium ions present on the bentonite molecule.

It is also desirable to add up to about 10% by weight of a plasticizer to the adhesives of the present invention in order to flexibilize the dried resin films and to increase their adhesion to glass. The particular plasticizer chosen must be one which is compatible with the resin and we have found the glycol dibenzoates to be most preferred, however, other compatible plasticizers may also be used. Furthermore, preservatives, color agents, defoamers, wetting agents, silane primers, etc. may be added in amounts up to a total of about 5% by weight without deleteriously affecting the properties of the adhesives.

The required viscosity of the final adhesive varies with the type of starch employed, the labeling machine, its speed, packaging needs and the environmental conditions under which it is to operate. In general, suitable viscosities may range from 10,000 cps. to 150,000 cps. measured at 22° C., however, they are usually in the range of 20,000 cps. to 60,000 cps. a range which yields systems well balanced in tack and flow.

Thus, the adhesives of the present invention comprise 10 to 35%, preferably 20 to 30%, starch; 3 to 20%, preferably 5.5 to 7% (dry weight), of a zinc salt of a carboxylated styrene-acrylate resin; 1.5 to 6%, preferably 4 to 5%, peptizer; the remainder of total 100% being water and sufficient ammonia to provide a pH of 7.5 to 10.

Preferred compositions will additionally include bentonite in an amount up to 2%, preferably 0.6 to 1%, and a resin compatible plasticizer in an amount up to 10%, preferably 2 to 6%, each based on the weight of the total adhesive.

In the examples which follow and in evaluating the products produced in accordance with the present invention, the following tests were employed to evaluate the degree of ice-proofness and the removability of the labels.

"Ice-Proof" Test—The general "ice-proof" laboratory test used to evaluate cold water resistance consists of applying a 1 mil wet coating ($\frac{1}{2}$ inch wide) to each end of a beer label and quickly pressing the label to a clean, standard 12 oz. beer bottle. Sets of six bottles are then permitted to dry for a specified period at room temperature and then immersed in 40° F. (4° C.) water maintained inside a refrigerator. They are observed each 24 hours and a record kept of the label condition, i.e. on, off, edges flagging, etc. Ice-proofness for 72 hours (soak) after a 72 hour drying period is usually considered optimum. The test is considered "pass" if none of the labels of set of six falls off.

"Label Removal" Test—The general label removal or "stripper" test consists of predrying labeled bottles for one month before immersion in a 150° F. (65° C.) bath composed of 5% NaOH and 0.1% wetting agent for two hours in order to simulate commercial bottle washing operations. A small mixer keeps the liquid swirling during the period and observations made of the label condition, i.e. time on, time off, etc. Sets of six are run this way. Fast removal, e.g. $\frac{1}{2}$ hour, is considered preferable but removal within the two hour period is usually considered sufficient. Commercial strippers which remove labels more efficiently usually run on 20 minute cycles. The test is considered "pass" if all of the set of six labels come off. It is considered "marginal" if one out of six stays on; all else is "fail".

EXAMPLE I

This example illustrates the preparation of the novel adhesives of the present invention.

A slurry was prepared using 50 parts (by weight) of water and 27 parts of mixture of amioca and corn starch (23 and 4 parts respectively). To this slurry was added a 5% aqueous dispersion containing 0.8 parts of bentonite and the mixture was blended for 15 minutes. 16.6 parts of Crilicon 30 (a 38% emulsion containing approximately 45% styrene, 55% ethyl acrylate, 3% carboxyl groups and approximately 6000 ppm zinc and 2 parts Benzoflex 50 (a plasticizer available from Velsicol Corp. comprising a blend of dipropylene glycol dibenzoate and diethylene glycol dibenzoate) were then added and the resultant mixture steam heated to 100° F. Then 3 parts urea and 1.6 parts dicyandiamide were added and the temperature raised to 140° F. after which 0.66 parts ammonia water (to a pH of approximately 9) were added and the temperature raised to 180° F. and maintained at that temperature one-half hour. The mixture was then cooled to approximately 100° to 120° F. and 0.2 parts Dowicide A (sodium orthophenyphenate preservative) and 4 additional parts Benzoflex added. The adhesive was then filtered and packed in drums.

After storage for 2 months, the drums were opened and were observed to be essentially unchanged in physical properties. On testing, the adhesive had a good working life, did not string when used in high speed labeling machines and retained a relatively constant viscosity during a three shift working day. The labeled bottles all passed both the ice proof (72 hour dry and 72 hour soak) and label removal tests described above.

EXAMPLE II

In a similar manner, other adhesives were formulated and tested in accordance with the teachings of the present invention. For comparative purposes, two commercially available styrene based adhesives were also tested as was an adhesive which did not contain any resin. The formulations are shown in Table I and the testing data in Table II.

TABLE I

| Ingredient | Composition | | | | | | |
|---|---|---|---|---|---|---|---|
| | A | B | C | D | E | F* | G |
| Water | 50.0 | 50.0 | 50.0 | 66.0 | 50.0 | 50.0 | 66.0 |
| Urea | 3.0 | 3.0 | 3.0 | 3.0 | 3.0 | 3.0 | 3.0 |
| Dicyandiamide | 1.6 | 1.6 | 1.6 | 1.6 | 1.6 | 1.6 | 1.6 |
| Ammonia Water | 2.3 | 2.3 | 2.3 | 0.66 | 2.3 | 0.66 | 0.66 |
| Preservative | 0.2 | 0.2 | 0.2 | 0.2 | 0.2 | 0.2 | 0.2 |
| Starch blend | 27.0 | 27.0 | 37.0 | 27.0 | 27.0 | 27.0 | 27.0 |
| Crilicon 30 (38% solids) | 16.0 | 32.0 | 16.0 | 16.6 | 16.0 | 16.60 | — |
| Bentonite | — | — | — | — | 0.8 | 0.8 | 0.8 |
| Benzoflex 50 plasticizer | — | — | — | 6.0 | — | 6.0 | 6.0 |

*formulation of Example I repeated.

TABLE II

| Composition | Ice Proof Dry/Soak | Label Removal | Storage Stability | Machining Rheology Initial/After 1 month storage | |
|---|---|---|---|---|---|
| A | 5 day/12 hr. | Pass | Stable | Fair | / Fair |
| B | " | " | " | " | " |
| C | " | " | " | " | " |
| D | " | " | " | " | " |
| E | 5 day/24 hr. | " | " | Good | Good |
| F | 72 hr/72 hr. | " | " | V. good | V. good |
| G | Fail | Not tested | Not tested | Not tested | Not tested |
| Adhesive containing styrene-maleic anhydride resin (See U.S. Pat. No. 3,939,108 | 72 hr. dry/ 72 hr. soak | Pass | Gelled after 2 months at room temperature | Fair | Poor |
| Commercially available styrene-acrylate resin adhesive (carboxylated) | 72 hr. dry/ 72 hr. soak | Pass | Gelled after 2 months at room temperature | Fair | Poor |

As shown in Table II, the adhesives formulated in accordance with the teachings of the invention exhibited superior stability and rheological properties while retaining commercially acceptable ice proof properties. In contrast, the two cold water resistant adhesives of the prior art, while superior with respect to ice proofness, gelled on aging and were poorer in machining.

EXAMPLE III

This example illustrates the use of varying amounts of resin, starch, peptizer, bentonite and other compounds within the scope of the present invention.

Thus, the procedure of Example I was repeated using the ingredients and amounts shown in Table III. In all cases cold water resistant adhesives were produced which were characterized by superior storage stability and machinability.

TABLE III

| Ingredient | Composition | | | | | | | | |
|---|---|---|---|---|---|---|---|---|---|
| | H | I | J | K | L | M | N | O | P |
| Water | 50.0 | 50.0 | 50.0 | 50.0 | 50.0 | 50.0 | 50.0 | 50.0 | 50.0 |
| Urea | 3.0 | 3.0 | — | 3.0 | 3.0 | 3.0 | 3.0 | 3.0 | 3.0 |
| Dicyandiamide | 0.8 | 3.2 | 1.6 | 1.6 | 1.6 | 1.6 | 1.6 | 1.6 | 1.6 |
| Ammonia Water | 0.66 | 0.66 | 0.66 | 0.66 | 0.66 | 0.66 | — | 0.66 | 2.3 |
| Preservative | 0.2 | 0.2 | 0.2 | 0.2 | 0.2 | 0.2 | 0.2 | 0.2 | 0.2 |
| Starch blend | 27.0 | 27.0 | 27.0 | 27.0 | 27.0 | 27.0 | 27.0 | 16.0 | 27.0 |
| Crilicon 30 (38% solids) | 16.6 | 16.6 | 16.6 | 8.3 | 16.6 | 16.6 | 16.0 | 16.0 | 16.6 |
| Bentonite | 0.8 | 0.8 | 0.8 | 0.8 | 0.4 | 1.6 | 0.8 | 0.8 | 0.8 |
| Benzoflex 50 plasticizer | 6.0 | 6.0 | 6.0 | 6.0 | 6.0 | 6.0 | 6.0 | 6.0 | 3.0 |

EXAMPLE IV

Adhesives similar to those described hereinabove may also be prepared using a variety of styrene-acrylate resins. As examples, the procedure of Example I may be repeated using resins comprising 10% styrene, 90% ethyl acrylate, 1% acrylic acid and 1000 ppm zinc; 90% styrene, 10% octyl acrylate, 10% acrylic acid and 15,000 ppm zinc; as well as a resin comprising 60% styrene, 40% butyl acrylate, 5% methacrylic acid and 9000 ppm zinc. In all cases the resultant cold water resistant adhesives will have the superior stability and rheology properties described herein.

We claim:

1. A storage stable cold water resistant adhesive comprising 10 to 35% by weight starch; 3 to 20% by dry weight of a zinc salt of a carboxylated styrene-acrylate resin comprising 10 to 90% styrene and 90 to 10% acrylate and further containing 1 to 10% of carboxylated monomers per 100 parts styrene-acrylate resin; 1.5 to 6% peptizer; the remainder to total 100% being water and sufficient ammonia to provide a pH of 7.5 to 10.

2. The adhesive of claim 1 wherein the starch is present in an amount of 20 to 30%; the resin salt in an amount of 5.5 to 7%; and the peptizer in an amount of 4 to 5%.

3. The adhesive of claim 1 wherein there is additionally present up to 2% by weight bentonite.

4. The adhesive of claim 3 wherein the bentonite is present in an amount of 0.6 to 1%.

5. The adhesive of claim 1 wherein there is additionally present up to 10% by weight of a resin compatible plasticizer.

6. The adhesive of claim 5 wherein the plasticizer is present in an amount of 2 to 6%.

7. The adhesive of claim 1 wherein the peptizer is a blend of urea and dicyandiamide.

8. The adhesive of claim 1 wherein the resin salt comprises 45% styrene, 55% ethyl acrylate, 3% acrylic acid and 6000 ppm zinc.

9. The adhesive of claim 1 wherein the starch employed is a blend of amioca and corn starch.

* * * * *